Dec. 10, 1929.  H. J. EDWARDS ET AL  1,738,876
ENGINE BALANCER
Filed May 23, 1924  2 Sheets-Sheet 1
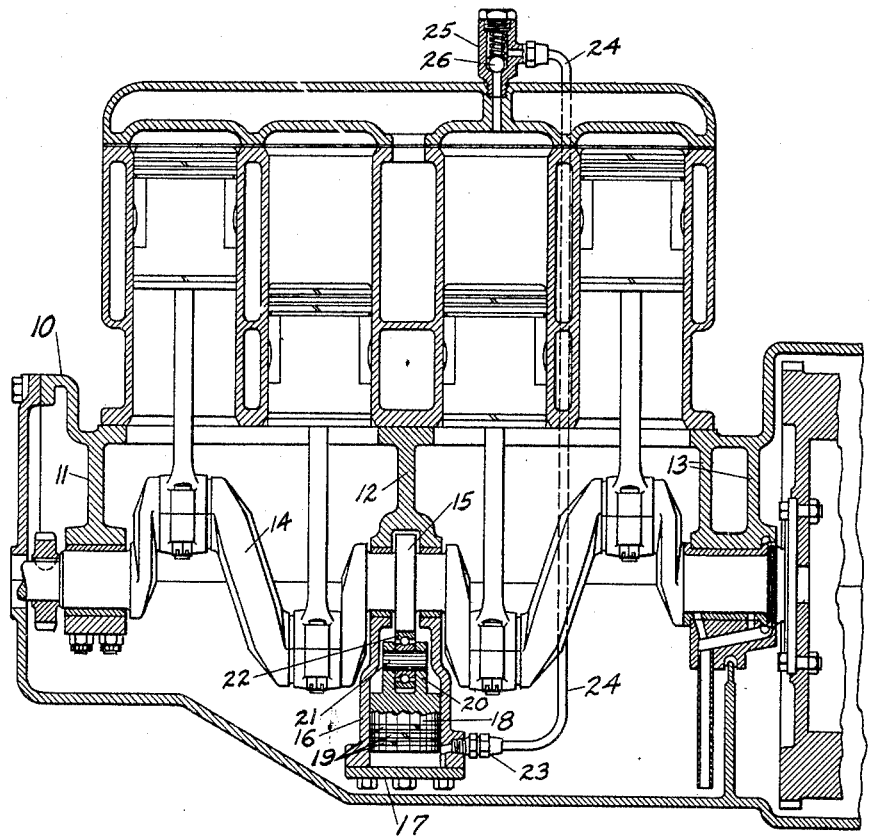
Fig. I
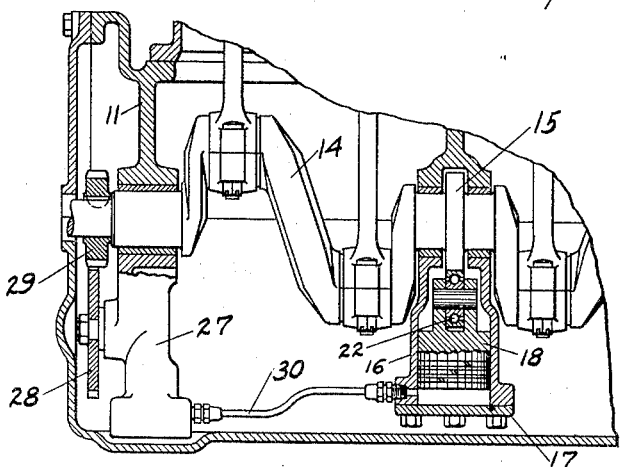
Fig. II
Inventors.
Henry J. Edwards
Alva B. Gilbert
BY Solon J. Boughton
ATTORNEY.

Dec. 10, 1929.   H. J. EDWARDS ET AL   1,738,876
ENGINE BALANCER
Filed May 23, 1924   2 Sheets-Sheet 2
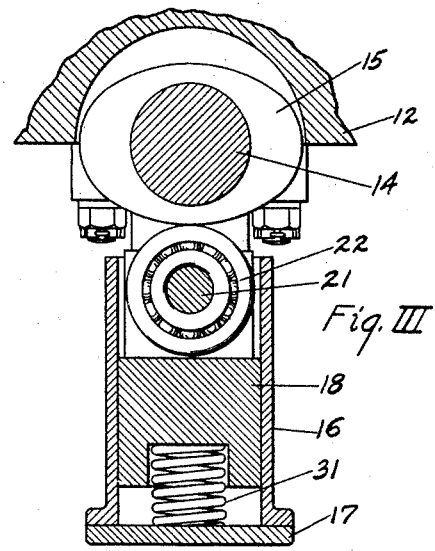
Fig. III
Inventors.
Henry J. Edwards
Alva B. Gilbert
BY Solon J. Boughton
ATTORNEY.

Patented Dec. 10, 1929

1,738,876

UNITED STATES PATENT OFFICE

HENRY J. EDWARDS, OF ELYRIA, AND ALVA B. GILBERT, OF TOLEDO, OHIO, ASSIGNORS TO THE WILLYS-OVERLAND COMPANY, OF TOLEDO, OHIO, A CORPORATION OF OHIO

ENGINE BALANCER

Application filed May 23, 1924. Serial No. 715,348.

This invention relates to improvements in engine balancers, and has reference particularly to that class of balancers which are designed to counteract the vibrations set up in engines by secondary inertia forces. A device for this purpose is illustrated in patent to Lanchester 1,163,832, in which is employed a pair of rotating weights with the necessary driving connections. One object of the present invention is the provision of a simpler apparatus for accomplishing the same results.

A further object is the provision of means which will permit the utilization of but one weight instead of two.

Another object is the elimination of all gearing and of shafts rotating at twice engine speed.

Still another object is the provision of means which will render practicable the use of a single cam mounted directly on the engine crankshaft.

Other objects, and objects relating to details of construction and economies of manufacture, will appear as we proceed with the description of those embodiments of the invention which, for the purposes of the present application, we have illustrated in the accompanying drawings, in which:

Figure I is the central longitudinal vertical section through a four-cylinder engine, embodying one form of our invention.

Fig. II is a fragmental view similar to Fig. I, but showing a modification, and

Fig. III is a transverse sectional view, taken at the center main bearing and showing still another modification of the invention.

Similar reference characters refer to like parts throughout the views.

In Fig. I, there is illustrated an internal combustion engine having a crankcase 10, the upper half of which is provided with integral transverse webs 11, 12 and 13, in which are located the front, center and rear bearings, respectively, for a crankshaft 14. The engine illustrated is one having four cylinders, but the application of the invention extends also to certain other types, as indicated in the co-pending application of Alva B. Gilbert, Serial Number 706,099, filed April 12th, 1924.

The center bearing of the crankshaft is split and the crankshaft is provided with a preferably integral cam 15 which occupies most of the space between the two parts of the bearings. This cam is shaped as shown in Fig. III, Supported from the web 12 there is a cylinder 16 closed at the bottom by a plate 17. Slidable within the cylinder 16 is a cylindrical weight 18 which may or may not be provided with flexible rings 19, in the nature of piston rings. The upper end of the weight carries ears 20 between which is mounted, by means of a pin 21, a ball bearing 22, the movable outer ring of the latter constituting a follower for the cam 15. A nipple 23 is threaded into the wall of the cylinder 16 and is connected by a conduit 24 with a valve casing 25, the latter being threaded into one of the cylinder heads of the engine. The casing 25 contains a spring-pressed ball check valve 26.

In Fig. II a different means is employed for maintaining pressure in the chamber at the bottom of the cylinder 16. In this figure an air compressor 27 of any suitable character is secured to the web 11 at the forward end of the crankcase, the mechanism of the compressor being driven by a gear 28 meshing with a timing gear 29 on the forward end of the crankshaft, and the compressor being connected with the chamber at the bottom of the cylinder 16 by a conduit 30.

When an engine is equipped with one of the forms of the invention illustrated in Figs. I or II is started for the first time, pressure is rapidly built up in the chamber beneath the weight 18 and elevates the weight until the ball bearing 22 comes into contact with the cam 15. This will occur while the engine is being given its preliminary run on the testing block at low speed by an electric motor or other outside power. After the cam and ball bearing come into contact, the two high spots on the cam depress the ball bearings twice for every revolution of the cam. The weight is therefore driven down an equal number of times, and each time compresses the air or other gas within the chamber at the bottom of the cylinder 16 and within the conduit leading thereto. As soon as the high spot on the cam moves away from the ball bearing, relieving the downward pressure on the weight, the compressed air beneath the latter exerts its influence and the weight rises, causing the ball bearing 22 to follow over the low surfaces on the cam. This cycle occurs twice for each revolution of the cam. There will necessarily be some leakage of air from the compression chamber past the reciprocating weight, but the reduction in pressure resulting in this leakage is being continually made up by new pressure furnished from the air-compressor 27 of Fig. II, or from the engine cylinder and piston of Fig. I. Preferably the parts are so designed that the chamber normally carries a pressure considerably in excess to what is required to hold the ball bearing follower against the cam. When the engine is not running, the leakage of air around the weight is negligible and consequently, there is always sufficient pressure to cause the weight to follow the cam when the engine is again started.

In Fig. III is illustrated a form of the invention which is like that of Figs. I and II, except that a spring 31 is employed instead of compressed air, to hold the ball bearing 22 against the cam 15.

It may be seen from the foregoing description, that the weight is moved through two complete cycles for each revolution of the crankshaft, and produces inertia forces which are of the same frequency as the secondary forces of the main reciprocating parts.

We claim as our own invention:

1. In a reciprocating engine, a cam driven at crankshaft speed, said cam having two high spots oppositely positioned, a weight mounted to reciprocate in a direction substantially parallel to the axes of the engine cylinders, said cam having contact with said weight to move it in one direction, and means for returning the weight and holding it against the face of the cam.

2. In a reciprocating engine, a cam driven at crankshaft speed, said cam having two high spots oppositely positioned, a weight mounted to reciprocate in a direction substantially parallel to the axes of the engine cylinders, said cam having contact with said weight to move it in one direction, and resilient means for moving the weight in the opposite direction.

3. In a reciprocating engine, a cam driven at crankshaft speed, said cam having two high spots oppositely positioned, a weight mounted to reciprocate in a direction substantially parallel to the axes of the engine cylinders, said cam being adapted to cause movement of the weight in one direction and spring means for moving the weight in the opposite direction.

4. In an engine, in combination, a plurality of cylinders, pistons reciprocally mounted in said cylinders, a crank shaft, connecting links connected to said pistons and said crank shaft, the arrangement being such that the center of the combined mass of the pistons and connecting links has a vibratory movement, a weight, a pair of cams on said crank shaft for moving said weight vertically in one direction twice during each revolution of said crank shaft, and means for moving said weight twice in the opposite direction during each revolution of said crank shaft.

5. A device for balancing the secondary forces of an internal combustion engine, comprising a weight shiftable in the direction along which said secondary forces act during the rotation of the crank shaft of the engine, a cam carried by the crank shaft, anti-friction means on said weight in contact with the periphery of said cam, said cam being formed to cooperate with said anti-friction means to shift said weight as the crank shaft rotates in the direction required to set up forces equal to and opposed to said secondary forces, and yielding means acting to hold said anti-friction means continuously in contact with the peripheral surface of said cam.

6. A device for balancing the secondary forces of a reciprocating engine, comprising a cam carried by the crank shaft of the engine and having a regularly curved peripheral surface at the outer ends of regularly spaced alternating relatively long and shorter radii, each relatively long radius lying in the plane of crank arms of the crank shaft, a weight, means for supporting the weight at the side of the crank shaft opposite the primary reciprocating parts of the engine so that the weight can move along a path substantially in line with the line along which the center of gravity of the reciprocating parts shifts as the crank shaft is rotated, a roller supported by said weight for rotating about an axis parallel to the axis of rotation of the crank shaft and in position to have rolling contact with the peripheral surface of said cam, and spring means acting on said weight to hold said roller continuously in rolling contact with the peripheral surface of the cam.

In testimony whereof, we affix our signatures.

HENRY J. EDWARDS.
ALVA B. GILBERT.